(12) United States Patent  
Berto

(10) Patent No.: US 7,222,900 B1
(45) Date of Patent: May 29, 2007

(54) MOTION ASSISTED MANURE FORK

(76) Inventor: Joseph Berto, 10984 Meadows Rd., White City, OR (US) 97503

( * ) Notice: Subject to any disclaimer, the term of this patent is extended or adjusted under 35 U.S.C. 154(b) by 0 days.

(21) Appl. No.: 11/487,592

(22) Filed: Jul. 13, 2006

Related U.S. Application Data

(63) Continuation-in-part of application No. 11/412,702, filed on Apr. 26, 2006.

(51) Int. Cl.
*A01D 9/00* (2006.01)

(52) U.S. Cl. .................. 294/55.5; 294/49; 209/417

(58) Field of Classification Search .................. 294/49, 294/50, 55.5, 59; 209/417–419; 56/400.04, 56/400.08
See application file for complete search history.

(56) References Cited

U.S. PATENT DOCUMENTS

| | | | | |
|---|---|---|---|---|
| 144,850 | A | | 11/1873 | Kaestner |
| 226,351 | A | | 4/1880 | Reddick |
| 1,274,927 | A | * | 8/1918 | Moon ........................... 37/189 |
| 1,390,870 | A | * | 9/1921 | Bittle ........................ 294/55.5 |
| 1,474,650 | A | * | 11/1923 | Storr ........................... 294/52 |
| 1,510,757 | A | * | 10/1924 | Ball ............................ 209/419 |
| 1,662,606 | A | * | 3/1928 | Hargadon ................... 209/419 |
| 4,461,458 | A | | 7/1984 | Poulin |
| 4,730,860 | A | | 3/1988 | Padgett |
| 5,417,044 | A | * | 5/1995 | Russo ..................... 56/400.11 |
| 5,791,706 | A | * | 8/1998 | Dolci ........................... 294/51 |
| 6,022,058 | A | * | 2/2000 | O'Rourke ................... 294/1.3 |
| 6,416,097 | B1 | | 7/2002 | O'Rourke |
| D463,075 | S | * | 9/2002 | Padgett ...................... D30/162 |
| 6,474,267 | B1 | * | 11/2002 | Padgett ....................... 119/526 |
| 6,494,514 | B1 | * | 12/2002 | Stinnett et al. .............. 294/59 |
| 7,044,520 | B2 | * | 5/2006 | Roberson, Jr. et al. .... 294/55.5 |

* cited by examiner

*Primary Examiner*—Dean J. Kramer
(74) *Attorney, Agent, or Firm*—Buchanan Ingersoll & Rooney LLP

(57) ABSTRACT

A motion assisted manure fork having a handle, a fork head having a plurality of tines, a leverage assembly and a motor assembly that imparts a sinusoidal motion to the plurality of tines. The fork head includes a frame having a neck dimensioned to receive one end of a handle and a plurality of tines. The plurality of tines has an inner tine section, and an outer tine section on each side of the inner section with a hinge positioned between the inner tine section and each of the outer tine sections. The fork head also has an angle of inclination, which divides the plurality of tines into an upper portion of tines at a first angle to the handle and a lower portion of tines at a second angle to the handle. A support member extends across the plurality of tines, which includes a plurality of supports positioned between the tines to provide strength to the fork head during use. The outer tine sections are attached to and extend from the frame, while the inner tine section is not fixedly attached to the frame except by the hinge.

15 Claims, 13 Drawing Sheets

MOTION ASSISTED MANURE FORK

CROSS REFERENCE TO RELATED APPLICATIONS

This application is a Continuation in part of U.S. patent application Ser. No. 11/412,702 filed Apr. 26, 2006, which is incorporated herein in its entirety.

FIELD OF THE INVENTION

The invention generally relates to an improved manure fork, and more particularly to a motion assisted or motorized manure fork.

BACKGROUND OF THE INVENTION AND BRIEF DESCRIPTION OF THE RELATED ART

It can be appreciated that for a considerable period of time, livestock animals that are normally confined in stalls or pens or use a stall to get out of the weather have been provided with bedding material of natural straw. This bedding is provided to absorb the urine produced while the animal is confined, and to improve the comfort of the animal. Such stalls, whether using straw bedding, shavings or sawdust materials, naturally require frequent removal of the urine soaked material. As a consequence of this confinement there are also considerable manure deposits, which, by the activity of the animal walking around the stall, can become mixed with the bedding and scattered around the stall. This mixture of urine, manure and bedding must be frequently removed and replenished for the health of the animals and to reduce noxious odors.

When raising or keeping horses, the bedding may be cleaned several times a day or completely stripped and replenished daily or weekly. Thusly, the cost and storage of bedding materials, the extent to which it is lost when cleaning and the size of composting piles and their disposal are problems faced by all in the field. During the past few decades, in addition to straw, two additional types of bedding have come into fairly regular use. One common type is pine or cedar wood shavings or chips, either in bulk form or compressed and bagged. The other being sawdust or compressed sawdust pellets. Since shavings and sawdust or pellets have come into common usage and that they are smaller or finer in comparison to the long strands of straw, during the removal of bedding some sifting can take place. All the urine soaked bedding will be removed and the undisturbed piles of manure will be discarded whole. However, the movement of horses in their stall results in many manure piles being broken down into smaller component manure balls. The sifting of the bedding to separate the small manure pieces from the voluminous bed of shavings results in considerably less of the bedding material being thrown out with the manure.

Manual cleaning of horse stalls or other livestock facilities is typically performed utilizing a manure fork, which consists of a fork head configured with a row of plastic or metal tines. A handle typically made of wood having a circular cross-sectional shape is attached to fork head.

In conventional practice of stall cleaning, there is substantial waste because much of the wood shaving bedding material becomes removed and discarded along with the manure, thus necessitating frequent costly replenishment that can amount to many cubic feet of shavings per week per animal, representing a substantial cost and profuse disposal factor. The main approach presently available to control excess shavings disposal is to train, motivate and supervise workers to take the extra time and diligent effort to manually agitate the fork in a vigorous and tiring fashion to promote the separation of manure pieces from the bedding, thus reducing the quantity by salvaging the wood shavings; however such special training and effort is likely to be merely a tradeoff, shifting the cost to labor and supervision, and could result in zero or negative savings overall. The cost of wasted bedding material is particularly high in prestigious operations and expensive boarding sites where, except for their exercise periods, the horses are normally confined in a stall. These stalls must be kept in top condition by frequent cleaning and wood shavings are utilized plentifully for health as well as aesthetic and show purposes.

Accordingly, it would be desirable to have a motion assisted manure fork that can save time, fatigue and reduce waste by assisting the user with the separation of the shavings, sawdust, pellets or other bedding from the manure balls.

SUMMARY OF THE INVENTION

In accordance with one embodiment, a motion assisted manure fork comprises: a handle; and a fork head comprising: a frame having a neck dimensioned to receive one end of the handle; a plurality of tines, the plurality of tines having an inner tine section, and an outer tine section on each side of the inner section; a support member extending across the plurality of tines, the support member comprising a plurality of supports positioned between the tines; and wherein the outer tine sections are attached to and extend from the frame, and the inner tine section is not fixedly attached to the frame except by a hinge.

In accordance with another embodiment, a motion assisted manure fork comprises: a handle; and a fork head comprising: a frame having a neck dimensioned to receive one end of the handle; and a plurality of tines; and a motor assembly, wherein the motor assembly imparts a sinusoidal motion to the plurality of tines.

In accordance with another embodiment, a manure fork comprises: a handle; and a fork head comprising: frame having a neck dimensioned to receive one end of a handle; a plurality of tines, the plurality of tines having an inner tine section, and an outer tine section on each side of the inner section; a hinge positioned between the inner tine section and each of the outer tine sections; and a support member extending across the plurality of tines, the support member comprising a plurality of supports positioned between the tines, wherein the outer tine sections are attached to and extend from the frame, and the inner tine section is not fixedly attached to the frame except by the hinge; and a motor assembly, wherein the motor assembly imparts a sinusoidal motion to the plurality of tines.

In accordance with a further embodiment, a motion assisted manure fork comprising: a handle; and a fork head comprises: a frame having a neck dimensioned to receive one end of the handle; a plurality of tines, the plurality of tines comprising: a movable inner tine section, the movable inner tine section having a first movable inner tine section, a second movable inner tine section and at least one fixed inner tine between the first movable inner tine section and the second inner tine section; and a fixed outer tine section on each side of the inner section; and a support member extending across the plurality of tines, the support member comprising a plurality of supports positioned between the tines.

In accordance with another embodiment, a motion assisted manure fork comprising: a handle; and a fork head comprises: a frame having a neck dimensioned to receive one end of the handle; and a plurality of tines; and a motor assembly, wherein the motor assembly imparts a sinusoidal motion to the plurality of tines.

In accordance with a further embodiment, a manure fork comprises: a handle; and a fork head comprising: frame having a neck dimensioned to receive one end of a handle; a plurality of tines, the plurality of tines comprising: a movable inner tine section, the movable inner tine section having a first movable inner tine section, a second movable inner tine section and at least one fixed inner tine between the first movable inner tine section and the second inner tine section; and a fixed outer tine section on each side of the inner section; a pair of hinges positioned between the first and second movable inner tine sections and the outer tine sections; a pair of hinges positioned between the first and second movable inner tine sections and the at least one fixed inner tine; and a support member extending across the plurality of tines, the support member comprising a plurality of supports positioned between the tines, wherein the outer tine sections are attached to and extend from the frame, and the inner tine section is not fixedly attached to the frame except by the hinge; a motor assembly; and a leverage assembly, wherein the leverage assembly is attached to at least a portion of the movable inner tine section at one end and moveably attached to the handle at a second, wherein the motor assembly imparts a sinusoidal motion to the plurality of tines via the leverage assembly.

In accordance with a further embodiment, a manure fork comprises: a handle; and a fork head comprising: a frame having a neck dimensioned to receive one end of the handle; a plurality of tines; a support member extending across the plurality of tines, the support member comprising a plurality of supports positioned between the tines, wherein the tine sections are attached to and extend from the frame, wherein the neck and the frame are constructed in such a fashion that the frame acts like a hinge assembly; and a leverage assembly, wherein the leverage assembly includes a motor assembly, which imparts a sinusoidal motion to the plurality of tines through the frame via a motion activation assembly and a connecting rod.

In accordance with another embodiment, a manure fork comprises: a handle; and a fork head, the fork head comprising: a frame having a neck dimensioned to receive one end of a handle; a plurality of tines, the plurality of tines comprising: a movable inner tine section, the movable inner tine section having a first movable inner tine section, a second movable inner tine section and at least one fixed inner tine between the first movable inner tine section and the second inner tine section; and a fixed outer tine section on each side of the inner section; a pair of hinges positioned between the first and second movable inner tine sections and the outer tine sections; and a pair of hinges positioned between the first and second movable inner tine sections and the at least one fixed inner tine; and a support member extending across the plurality of tines, the support member comprising a plurality of supports positioned between the tines, wherein the outer tine sections are attached to and extend from the frame, and the inner tine section is not fixedly attached to the frame except by the hinge; a leverage assembly; and a motor assembly within the handle, wherein the motor assembly imparts a sinusoidal motion to the plurality of tines through the leverage assembly via a motion activation assembly and a connecting rod.

In accordance with a further embodiment, a manure fork comprises: a handle; and a fork head, the fork head comprising: a frame having a neck dimensioned to receive one end of the handle; a plurality of tines; a support member extending across the plurality of tines, the support member comprising a plurality of supports positioned between the tines, wherein the tine sections are attached to and extend from the frame, the frame having a neck dimensioned to receive one end of a handle, wherein the neck and frame are constructed in such a fashion that the frame acts like a hinge assembly; a leverage assembly; and a motor assembly within the handle, wherein the motor assembly, which imparts a sinusoidal motion to the plurality of tines through the leverage assembly via a motion activation assembly and a connecting rod.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Figure 1:
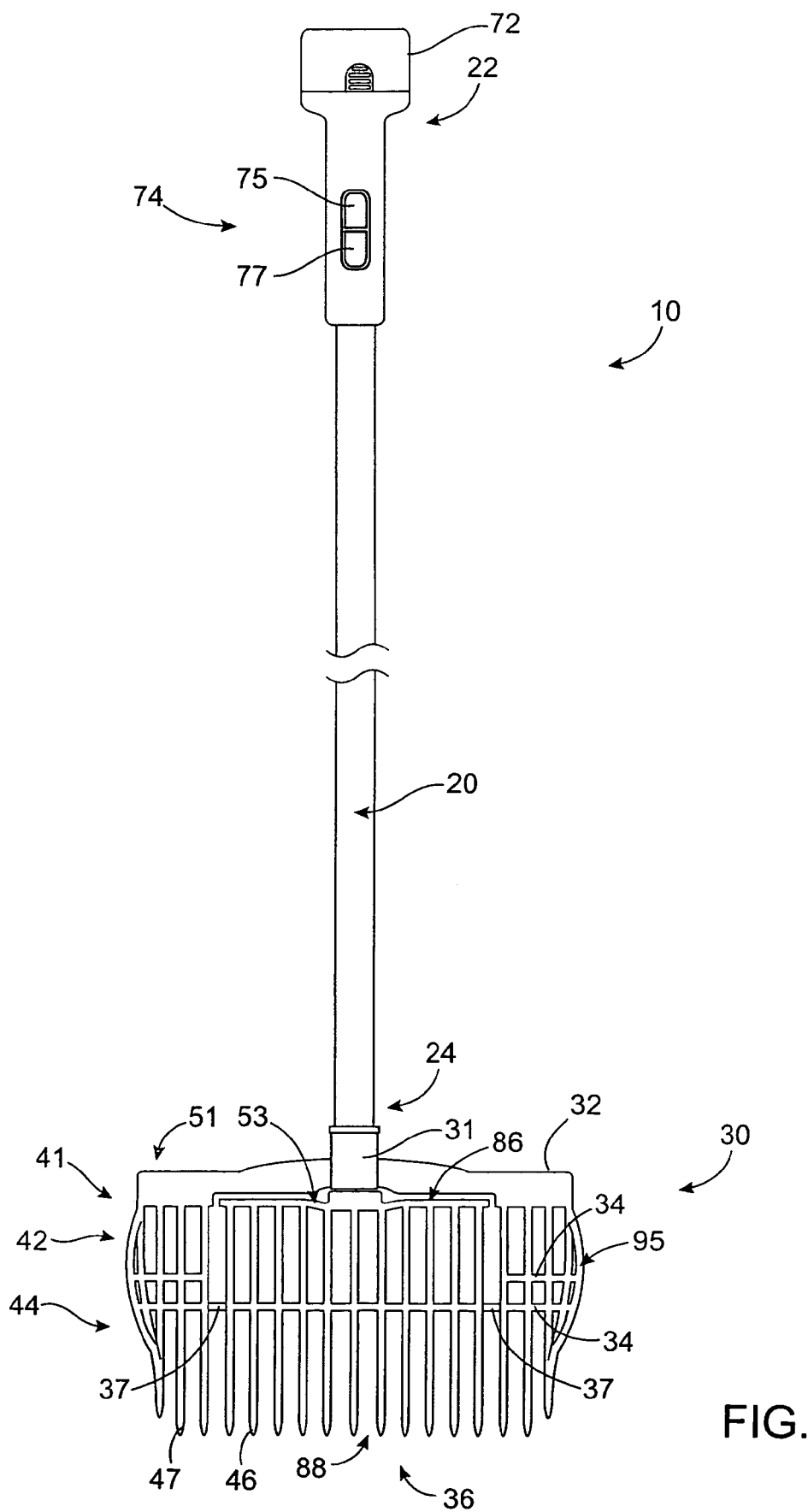
FIG. 1 shows a perspective view of a motion assisted manure fork having an external power source.

FIG. 1 shows a perspective view of a motion assisted manure fork 10. As shown in FIG. 1, the motion assisted manure fork 10 includes a handle 20 and a fork head 30. The handle 20 includes a first end 22 and a second end 24, which is attachable to the fork head 30. The first end 22 of the handle 20 preferably includes an external power source 72 and a switch 74. The power source 72 is preferably detachable and mounted on the end of the handle to facilitate servicing. The switch 74 preferably includes an on/off position 75, and can include a variable speed control switch 77. The switch 74 can be a rotary switch, a slide switch a trigger switch or other suitable switch, which controls the on/off function of a motor assembly 70 (FIG. 3), as well as the variable velocity and frequency at which the motor assembly 70 can impart a sinusoidal motion to a plurality of tines 36 in such a manner that the tines 36 can be displaced from their equilibrium or resting position to a periodic or cyclic motion. Furthermore, it can be appreciated that by varying the displacement, velocity, acceleration and/or frequency of the tines 36, the sinusoidal motion imparted to the tines 36 can include oscillation, vibration, or a pendulum motion.

Figure 2:
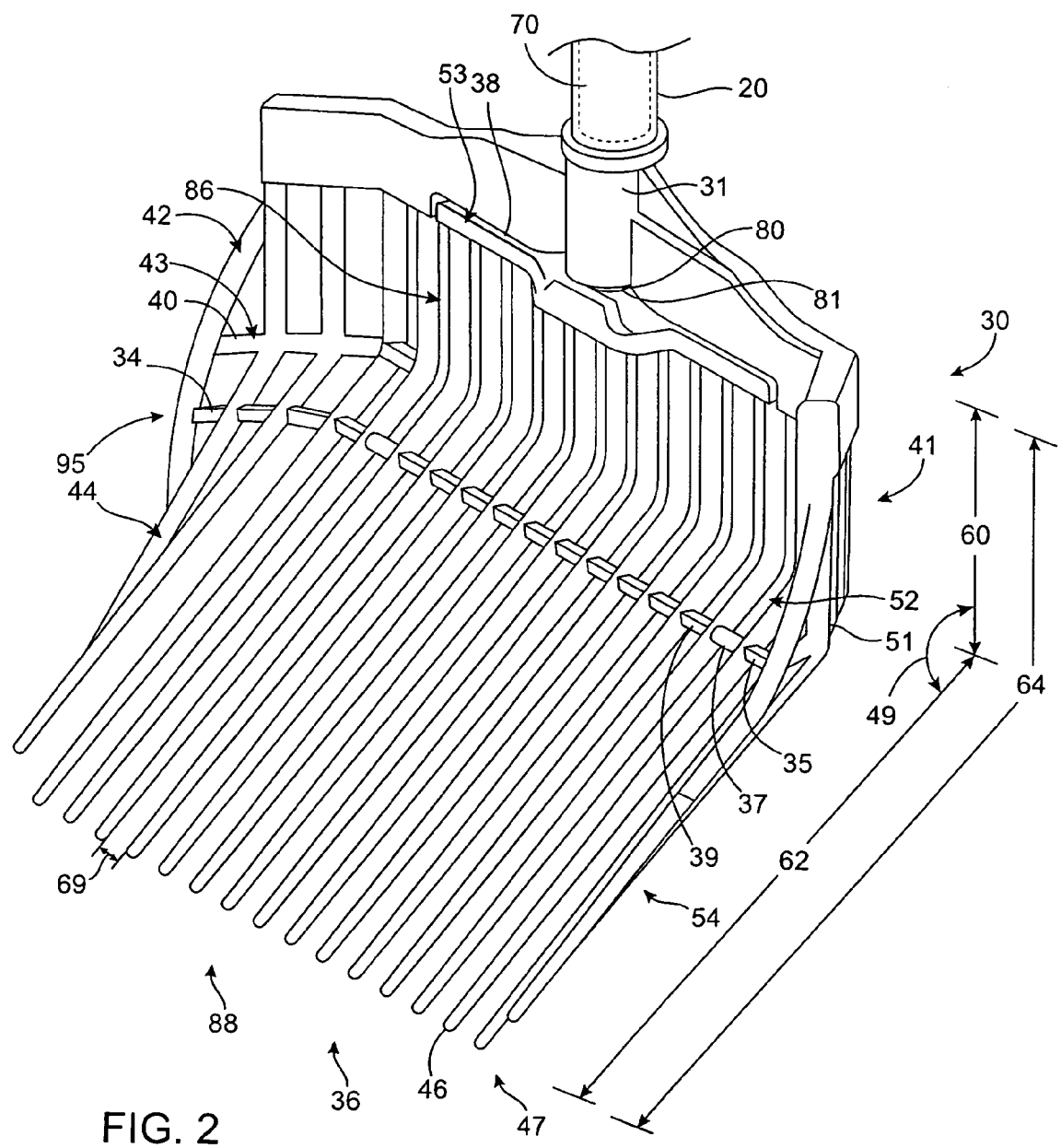
FIG. 2 shows a perspective view of the fork head of the motion assisted manure fork as shown in FIG. 1.

The fork head 30 comprises a neck 31, which receives the second end 24 of the handle 20, a frame 32, and a plurality of tines 36. The plurality of tines 36 extend from the frame 32 at a first or upper end 41 to a second or lower end 47, wherein each of the plurality of tines 36 has a tip 46. The plurality of tines 36 is divided into a movable inner tine section 53 and a fixed outer tine section 51 between which there is a connecting hinge 37. The plurality of tines 36 typically include at least one support member 34, extending across the width of the plurality of tines 36. The hinge 37 location separates the inner tine section 53 into an upper segment 86 and a lower segment 88 (FIG. 2). At least one support member 34 comprises a plurality of supports 35 positioned between the tines 36 to provide strength to the fork head 30 during use. As shown in FIG. 1, it can be appreciated that additional support members 34, can be positioned on the outer tine section 51. In addition, the frame 32, and the outer tine section 51 can be curved or angled upward to form a scoop or basket-like fork head 30 to assist with the gathering and sifting of the manure from the shavings, sawdust or other siftable material.

Figure 3:
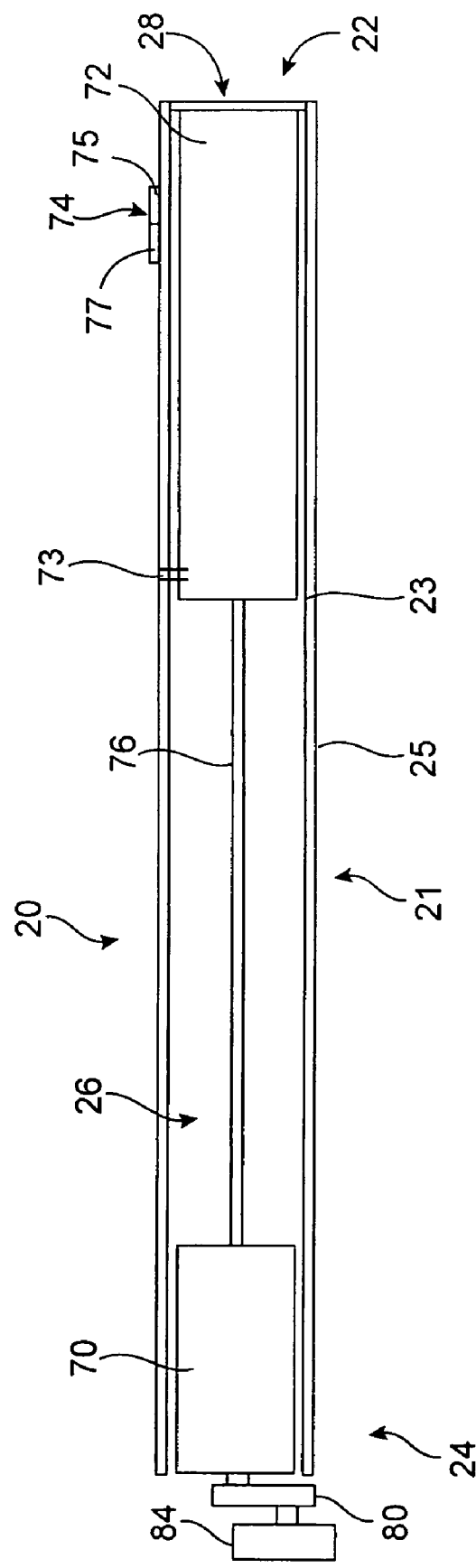
FIG. 3 shows a cross-sectional view of the handle portion of the motion assisted manure fork with an internal power source.

As shown in FIG. 1, the handle 20 is preferably an elongated hollow tubular or elliptical member 21 having an interior surface 23 and an exterior surface 25 (FIG. 3). The handle 20 is preferably rigid and can be molded from a lightweight fiberglass material, aluminum, or a synthetic plastic or rubber material. It can be appreciated that any suitable material can be used as long as the material provides the handle 20 with sufficient rigidity to lift upwards of 35 lbs. The interior surface 23 of the handle 20 preferably houses an electrical cord or wire 76 connecting the power source 72 to the motor assembly 70 and may also house an integral power source 72. The handle 20 also preferably includes a control system 74 located on an exterior surface 25 of the handle 20.

As shown in FIG. 1, the power source 72 and the control system 74 are preferably positioned near the first end 22 of the handle 20. It can be appreciated that the power source 72 and control system 74 does not need to be at the same angle as the handle 20. The positioning of the power source 72 and the control system 74 is not only based on ease of use and the need to the have the controls nearest at least one hand of the user, but also assists with the balancing of the fork 10. It can be appreciated that the power source 72 and the control system 74 can be separated and positioned at other location along the interior of the handle or on the exterior 25 of the handle 20 at a suitable location, for example, in such case where the handle 20 is constructed of a solid material, such as wood. Alternatively, the power source 72 and/or control system 74 can be attached to the exterior 25 of the handle 20 at a midpoint between the first 22 and second ends 24.

The power source 72 is preferably a rechargeable power source in the form of a rechargeable battery or batteries, or secondary cells, which can be re-charged after they have been drained. This is preferably performed by applying externally supplied electrical current, in the form of a charger or recharger (not shown), which causes the chemical changes that occur in use to be reversed. It can be appreciated that the rechargeable battery can be any suitable rechargeable device, including but not limited to any suitable "dry cell" type battery, including nickel-cadmium (NiCd), nickel metal hydride (NiMH), and lithium-ion (Li-Ion) cells. Alternatively, a disposable battery source can be used, such as standard alkaline or lithium battery. It can be appreciated that in any embodiment of the invention, for convenience of battery recharging, a commercially available charger can be made and arranged to conveniently contact and charge the power source 72 in place from the AC power line between usage events in the well manner of well-known recharging cordless tools such as hand drills and power screw drivers. The handle 20 and/or power source 72 will preferably have a connection 73 (FIG. 3) dimensioned to receive an AC power line to recharge the power source 72 as needed. It can also be appreciated that the battery may be removed altogether to be serviced or recharged at a remote charging station.

If a standard alkaline type or other replaceable battery is used, in accordance with another embodiment, the first end 22 can include a removable cap 28 (FIG. 3), which can be removed to access the power source 72. The removable cap can include a set of thread, which match a corresponding thread pattern on the exterior surface 24 of the first end 22 of the handle 20. It can be appreciated that in an alternative embodiment, the power source 20 can include any suitable power source including but not limited to gasoline or gas powered motor.

FIG. 2 shows a perspective view of the fork head of the motion assisted manure fork 10 as shown in FIG. 1. As shown in FIG. 2, the fork head 30 includes a series or plurality of tines 36 which includes an inner tine section 53 and an outer tine section 51. The angle 49 separates the plurality of tines of the outer section 51 into the upper segment 42 and the lower segment 44. The outer section 51 of tines 36 on each end of the frame 32 are attached to and extend from the frame 32. The inner tine section 53 of tines 36 are not fixedly attached to the frame 32, but are attached to the outer tine section 51 by the hinge 37. It can be appreciated that between the inner tine section 53 and the outer section of tines 51 as well as the frame 32 of the fork head 30, a space or slot 38 there between can be present. Alternatively, the space or slot 38 between the frame 32 and the upper segment 86 of the inner tine section 53 of tines 36 can be filled with an elastic material or any other suitable material, wherein upon an imparting of a force to the upper tine segment 86 of the inner tine section 53, a sinusoidal motion can be imparted to the tines 36 in such a manner that the tines 36 are displaced from their equilibrium and/or a resting position. The hinge 37 can be made of any suitable material, including an elastomeric material, plastic, a steel wire encased in plastic. Alternatively, the hinge 37 can be a bearing, a bushing combination, or other suitable rod combination.

The upper or first segment 42 of the outer tine section 51 is connected to the frame 32 of fork head 30 at a first or upper end 41 and to the angle of inclination 49 at a lower end. The lower segment 44 of the outer tine section 51 is connected to the angle of inclination 49 and extends to a second or lower end 47. At the second or lower end 47, the tines 36 have a tip 46. The tip 46 of the tines 36 can be a round tip, a pointed tip, a flat tip, a flattened surface or other end. The fork 30 is preferably made from a plastic material, such as polycarbonate.

As shown in FIG. 2, the plurality of tines 36 typically include at least one support member 34, extending across the width of the plurality of tines 36. The support member 34 comprises a plurality of supports 35 positioned between the tines 36 to provide strength to the fork head 30 during use. In addition, as shown in FIG. 2, additional support members 34 can be positioned across the tines 36 of the outer tine section 51 to provide additional support to the fork head 30. The additional support members 34 preferably positioned along the angle of inclination 49, however, they can be positioned along any suitable portion of the outer tine section 51. In addition, the upper and lower 42, 44 segments of the outer tine section 51 can include a curved or angled outer tine member 95, which is curved or angled upward to form a scoop or basket-like fork head 30 to assist with the gathering and sifting of the manure from the shavings, sawdust or other siftable material.

The support member 34 typically coincides with a hinge 37 of the fork head 30. It can be appreciated that the support member 34 does not necessarily coincide with the hinge 37. It can also be appreciated that where the upper segment 42 and the lower segment 44 of the plurality of tines 36 transitions from a first position, which is in a relatively parallel relationship to the handle 20 to a second position at the angle of inclination 49, wherein the upper and lower segments 42, 44 of the tines 36 are at an angle to one another, there may or may not be a hinge 37 or support member 34 at that point. The plurality of tines 36 preferably have an over length 64 of 10 to 18 inches and more preferably 11 to 15 inches. The angle of inclination 49 separates the plurality of tines into the upper segment 42 having an overall length 60 of between about 2 to 4 inches and the lower segment 44 having an overall length 62 of between about 8 to 16 inches.

Figure 4:
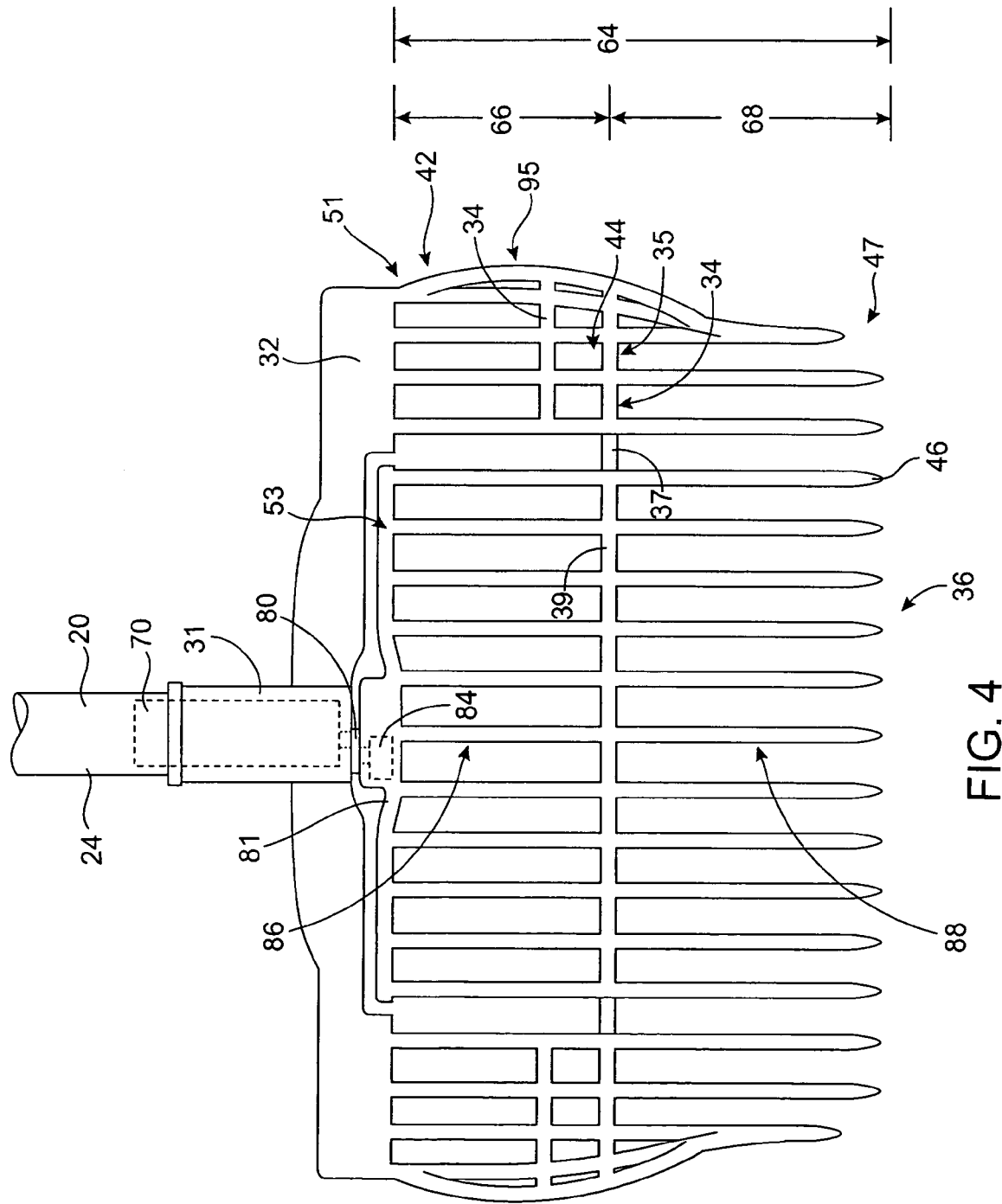
FIG. 4 shows a perspective view of the fork head of a motion assisted manure fork according to a further embodiment.
Figure 5:
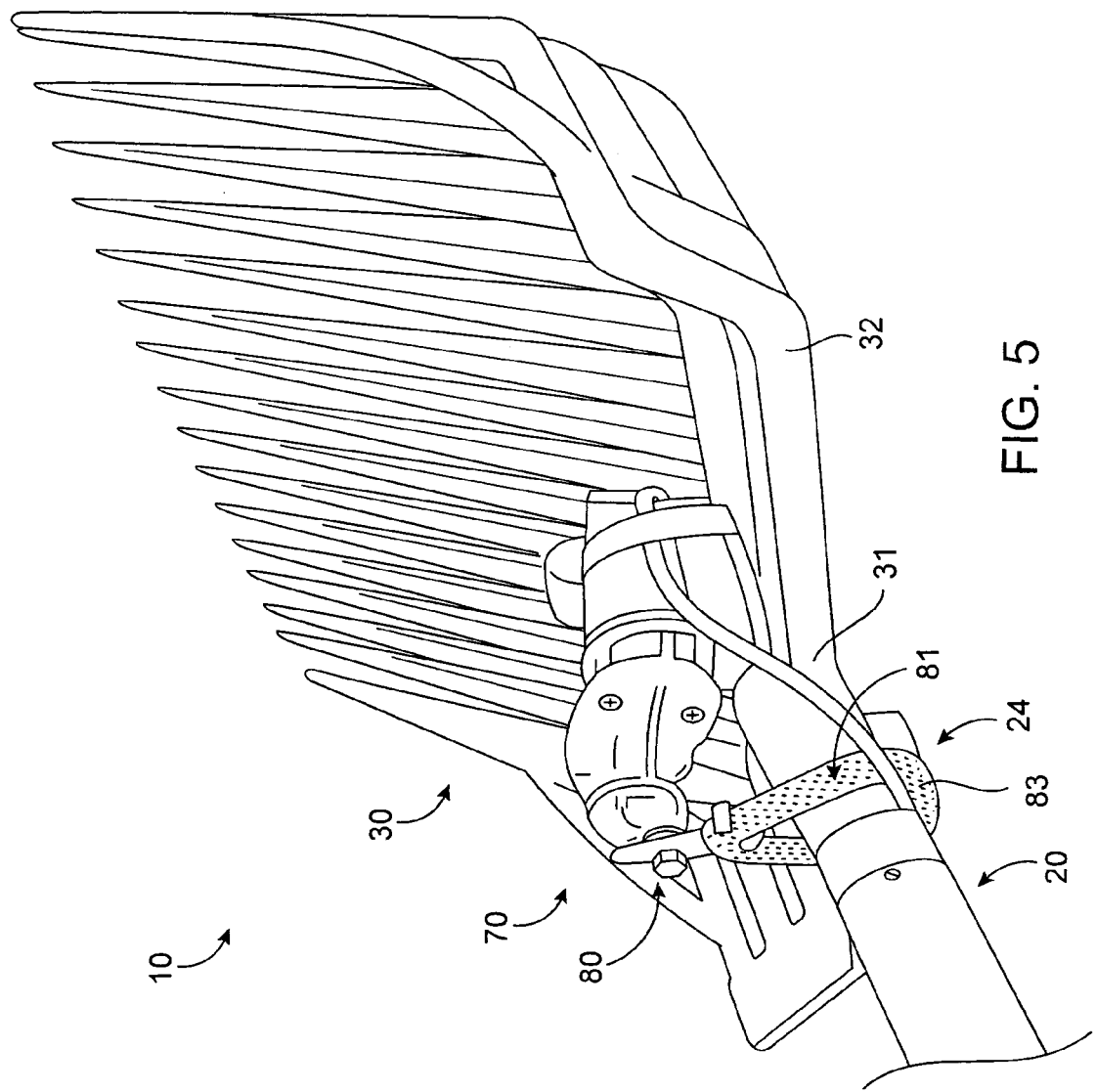
FIG. 5 shows a perspective view of a manure fork with a top mounted motor assembly.
Figure 6:
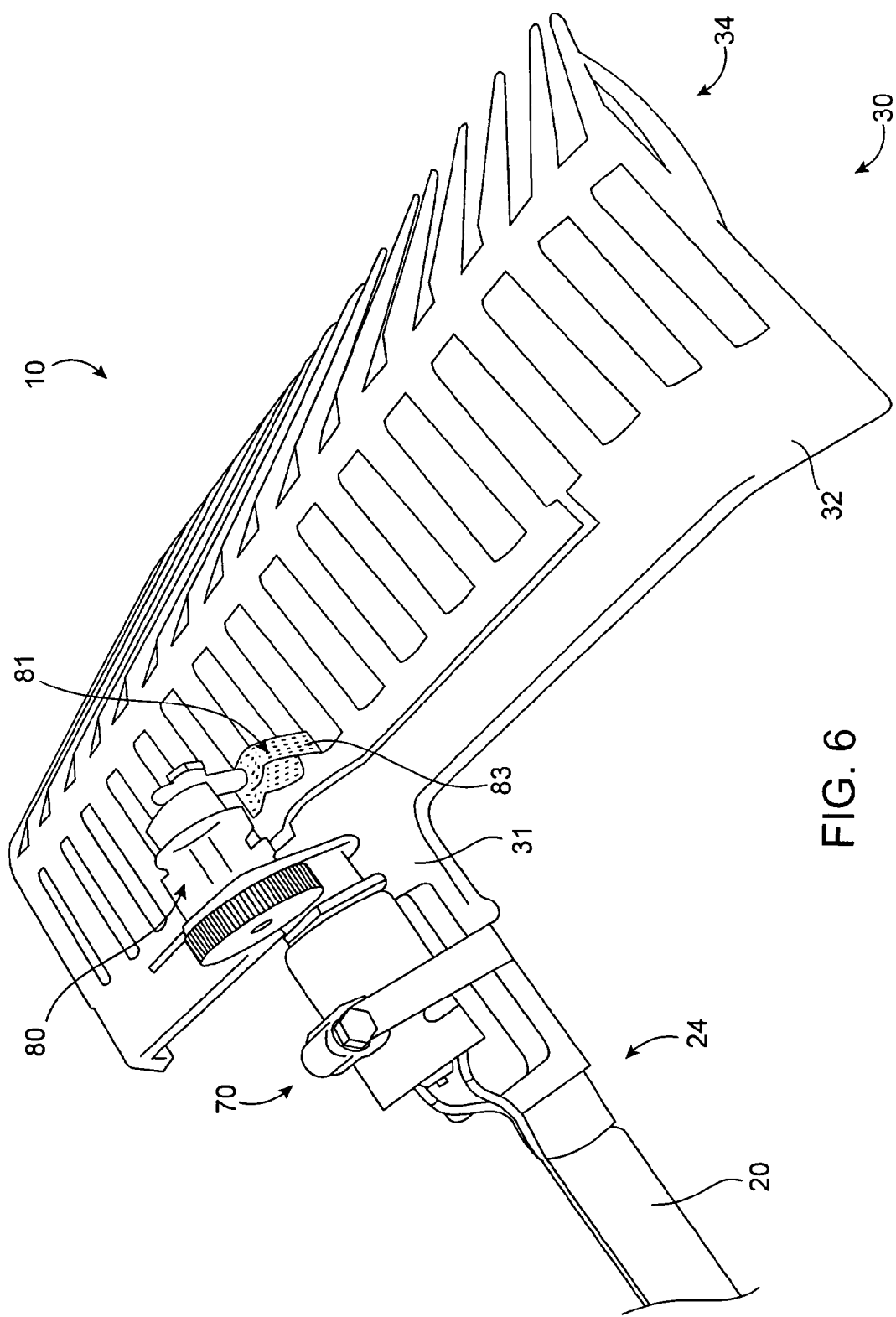
FIG. 6 shows a perspective view of a manure fork with a bottom mounted motor assembly.
Figure 8:
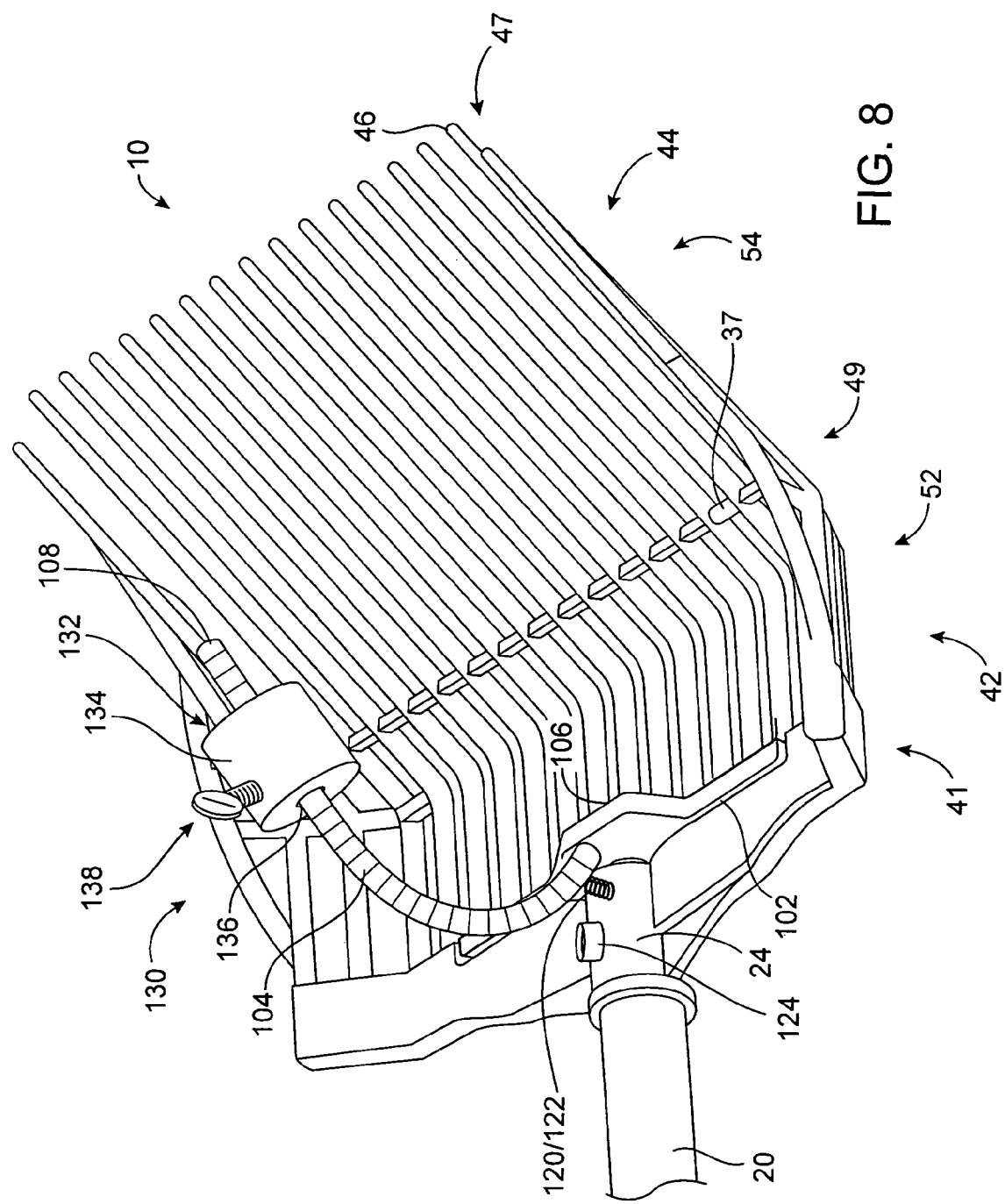
FIG. 8 shows a perspective view of a motion assisted manure fork in accordance with a further embodiment.

The motor assembly 70 is preferably located within the interior surface 23 of the handle 20 at or near the second end 24 of the handle 20. However, it can be appreciated that in an alternative embodiment as shown in FIGS. 5, 6 and 8, the motor assembly 70 can be mounted on the exterior 25 of the handle 20 either adjacent to the handle 20 or on the upper tine segment 86 of the inner tine section 53. As shown in FIG. 2, the motion activation assembly 80 of the motor assembly 70 preferably extends beyond the second end 24 of the handle 20 and is attached from the upper tine segment 86 to the second end 22 of the handle 20 by a suitable connection assembly 81 (FIG. 4). The motor assembly 70 is preferably an electric motor having a variable speed system at the motion activation shaft ranging from about 2 Hz to 60 Hz and more preferably a variable speed range of 2 to 30 Hz.

It can be appreciated the variable speed function of the motor assembly 70 and the control system 74 can include a defined speed function, such as a single, a dual, tri, quad speed system. For example, the variable speed function can include a 2-Hz setting and a 12-Hz setting. It can be appreciated that depending on the configuration of the motion activation assembly 80, the connection assembly 81 and the connecting member 83 that up to approximately 10 Hz, the motor assembly 70 will impart a sinusoidal motion, which is of a general oscillating or pendulum motion (i.e., an up and down motion) to the tines 36. Meanwhile at greater than 10 Hz, the motor assembly 70 imparts a sinusoidal motion, which will impart a vibrating motion, typically with a oscillation movement thereto, wherein the tines 36 appear to move in an up and down and a side to side motion.

FIG. 2 shows a perspective view of a manure fork 10. As shown in FIG. 2, the motor assembly 70 is preferably located within the neck 31 of the fork head 30 and includes a connection assembly 81, which is attached or secured to the upper tine segment 86 of the inner tine section 53. The motion activation assembly 80 preferably includes a roller bearing 84 (FIGS. 3 and 4) located within a slot of the connection assembly 81, and bridging the gap 38 between the frame 32 and the upper tine segment 86. The fork as shown in FIGS. 1 and 2, provides a mechanically driven or motorized manure fork with medium displacement (MD) and a low to medium frequency (LF/MF). In operation or use, the fork 10 is typically best suited for smaller and medium sized compressed and bagged shavings, sawdust and pellets.

As shown in FIG. 2, the motor assembly 70 is preferably enclosed within the neck 31 of the fork head 32. However, it can be appreciated that the motor assembly 70 can be enclosed within the second end 24 of the handle 20. The motor assembly 70 preferably comprises an electric or other suitable motor with a motion activation assembly 80 for imparting a sinusoidal motion to the tines 36 via the upper tine segment 86 of the inner tine section 53. The upper tine segment 86 of the inner tine section 53 provides support for the first or upper ends 41 of the inner tine section 53 and also provides a location or point for attachment of the connection assembly 81 to the motion activation assembly 80 of the motor assembly 70. The connection assembly 81 preferably includes a connection assembly 81 to the motion activation assembly 80, which imparts the sinusoidal motion from the motor assembly 70 to the fork head 30 and the plurality of tines 36.

The connection assembly 81 is preferably connected to a bearing 84 and cam motion activation assembly 80 mounted to the motor assembly 70. As shown in FIG. 2, the connection assembly 81 is attached to the upper tine segment 86 of the inner tine segment 53. The upper tine segment 86 forms the first or upper end 41 of the inner tine section 53 of tines 36 near the portion of the fork 10, wherein the handle 20 connects to the fork head 30. The upper tine segment 86 of the inner tine section 53 and the frame 32 are preferably separated by a gap, space or slot 38. The gap, space, or slot 38 is preferably between about a $\frac{1}{16}$ of inch to about $\frac{5}{8}$ of inch and more preferably about $\frac{1}{16}$ to $\frac{1}{8}$ of an inch. However, it can be appreciated that the gap, space, or slot 38 can be filled with an elastic material or other suitable material, which can be placed between the frame 32 and the upper tine segment 86.

As shown in FIG. 2, the handle 20 is preferably connected to the fork head 30 at a neck 31 on the fork frame 32. The handle 20 can be connected to the fork frame 32 via the neck 31 by clamping, by bolting, by threading, by rivets, by gluing, by force fit or any other known means.

In one embodiment, the motor assembly 70 and the motion activation assembly 80 including the connection assembly 81 and bearing 84 impart a sinusoidal motion to the tines of the fork 36, which can include a series of periodic cycles having any or a combination of the following: (1) Low displacement (LD) wherein the tips 46 of the tines 36 move less than $\frac{1}{2}$ inch up and down; (2) Medium displacement (MD) wherein the tips 46 of the tines 36 move up and down $\frac{1}{2}$ to 2 inches; and (3) High displacement (HD) wherein the tips 46 of the tines 36 move up and down 2 inches or more. In addition, the frequency of the tips 46 can include variable cycles or frequencies including: (1) Low frequency (LF) wherein the tips 46 are moving up and down at fewer than 10 Hz; (2) Medium frequency (MF) wherein the tips 46 are moving up and down and/or vibrating at 10 Hz to 35 Hz; and (3) High frequency (HF) wherein the tips 46 are actively vibrating and/or wildly shaking at 35 Hz to 60 Hz. The configuration of the fork 10, fork head 30 and position of the motor assembly 70 imparts the desired displacement and frequency to the tines 36 depending on the use of the fork 10 and the user's preferences. It can be appreciated that the above-mentioned motion of the tines 36 are only examples of one embodiment, and that based on the sinusoidal motion generation of the motor 70 and motion activation assembly 80, that varying any of the following variables, displacement, velocity, acceleration, and/or frequency can impart different sinusoidal motions and/or movements into the tines 36 of the fork 10. It can also be appreciated the varying the shape, size, length, or composition of the tines 36, can be made to effect their natural resonant frequency. It can be appreciated that vibrations of varying frequencies are also being applied to the outer portions, frame 32 and support members of the fork 30.

FIG. 3 shows a perspective view of the handle end of the motion assisted manure fork 10 with the power source 72 located within the handle 20. As shown in FIG. 3, the handle 20 is preferably an elongated hollow tubular or elliptical member 21 having an interior surface 23 and an exterior surface 25. The handle 20 is preferably rigid and can be molded from a lightweight fiberglass material, aluminum, or a synthetic plastic or rubber material. The neck 31 of the fork head 30 houses the motor assembly 70. The handle 20 houses an electrical cord or wire 76 connecting the power source 72 to the motor assembly 70 and may also house an integral power source 72. The handle 20 also preferably includes a control system 74 located on an exterior surface 25 of the handle 20. The control system 74 can include an on/off switch 75 and an optional speed control mechanism 77 in the form of a rotary dial, a slide switch, a trigger type device or other suitable mechanism to provide the fork 10 with a variable speed system. It can be appreciated that the on/off switch 75 and the variable speed control mechanism 77 can be combined into a single unit in the form of a slide switch, trigger, rotary type device or other suitable design.

FIG. 4 shows a perspective view of a fork head 30 in accordance with another embodiment. As shown in FIG. 4, the fork head 30 includes a series or plurality of tines 36, the upper or first segment 42 of the outer tine section 51 is connected to the frame 32 of fork head 30 at a first or upper end 41 and to the angle of inclination 49 at a second or lower end 43. The lower segment 44 of the outer tine section 51 is connected to the angle of inclination 49 and extends to a second or lower end 47. At the second or lower end 47, the tines 36 have a terminus or tip 46. The terminus or tip 46 of the tines 36 can be a round tip, a pointed tip, a flat tip, a flattened surface or other end.

The distance 66 of the upper or first segment 86 from the frame 32 to the hinge line 39 relative to the distance 68 of lower or second segment 88 from the hinge line 39 to the tip 46 of the tines 36 will typically have a ratio of between about 1 to 5 and 5 to 5. For example, the distance 66 from the frame 32 to the hinge 37 will preferably be between about 1 to 6 inches and more preferably between 2 and 4 inches with the distance 68 from the hinge 37 to the tip 46 of the tines 36 between 6 and 12 inches and more preferably between about 7 and 10 inches. The tines 36 will preferably have an overall length 64 of about 10 to 18 inches and more preferably an overall length 64 of about 11 to 15 inches. The tines 36 will preferably number between 6 and 30 and having a width of about 4 to 24 inches, and more preferably having approximately 16 to 20 tines and having a width of 12 to 18 inches, and most preferably comprising 18 tines with a width of 15 inches.

Figure 9:
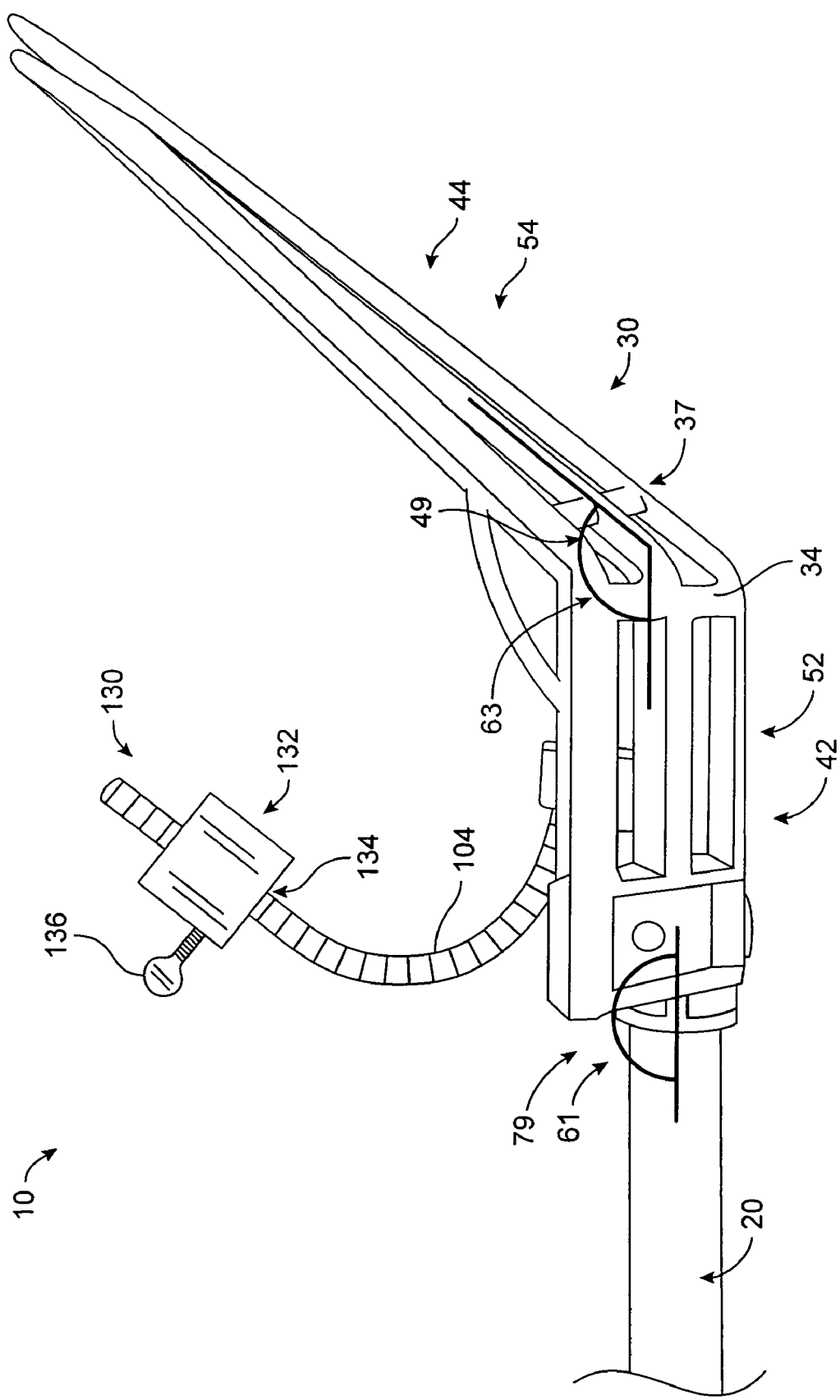
FIG. 9 shows a side view of the motion assisted manure fork as shown in FIG. 8.

The upper or first segment 42 is typically substantially parallel to the handle 20 and the lower or second segment 44 forms an angle of inclination 49 with the upper or first segment 42 (FIG. 9). This angle of inclination 49 can be between about 30 degrees and 60 degrees and more preferably the angle of inclination 49 is between about 35 degrees and 45 degrees. It can be appreciated that the hinge 37 can be moved either forward (i.e., closer to the tip 46) or backward (i.e., towards the frame 32) without moving the support member 34 between the upper and lower segments 86, 88 or angle of inclination 49. In this embodiment as shown in FIG. 4, wherein the support member 34 and the angle of inclination 49 do not coincide with one another, it can be appreciated that the fork head 30 can show improved sifting ability since the low point of the fork head 30 during use is typically at the intersection of the angle of inclination. It is to be appreciated that the hinge 37 can be at any point between the inner tine section 53 and the outer tine section 51 and may not necessarily coincide with the support member 34 or the low angle of inclination 49. The hinge 37 is generally located in a position to optimize the motion between the upper segment 86 and the lower segment 88 of the inner tine section 53 to enhance the sifting ability of the fork head 30.

The tines 36 are preferably spaced apart at a distance 69 of between 0.125 to 1.25 inches, and more preferably between 0.25 to 0.75 inches. The optimal distance 69 is preferably selected based on the size, shape and consistency of the bedding being cleaned. In addition, the length of the plurality of tines 36 in the upper segment 86 to the plurality of tines 36 in the lower segment 88 of the inner tine section 53 can vary, the upper segment 86 having a length of 0 to 6.0 inches and a lower segment 88 having a length of 14.0 to 6.0 inches in length, which are preferably at a ratio from 1 to 5 to 5 to 5, wherein the upper segment 86 and the lower segment 88 are separated by the hinge 37. In addition, the length of the plurality of tines 36 in the outer tine section 51 in the upper segment 42 to the plurality of tines 36 in the lower segment 44 can be at a ratio of 1 to 5 to 5 to 5, wherein the upper segment 42 and the lower segment 44 are separated by the angle of inclination 49. In addition, it can be appreciated that the distance 69 between the plurality of tines 36 can differ between the upper and lower segments 42, 44 of the outer tine section 51, the upper or lower segments 86, 88 of the inner tine section 53. For example, in one embodiment, the distance 69 between the tines 36 of the upper segment 86 can be between about 0.125 and 1.25 of an inch, with the distance 69 between the tines 36 of the lower segment 88 are between 0.125 and 1.25 inches.

FIG. 5 shows a perspective view of the motion assisted manure fork 10 having a top mounted motor assembly 70 connected directly to the upper tine segment 86 of the inner tine section 53. The motor assembly 70 is attached to the upper tine segment 86 of the inner tine section 53 at one end and includes a connection assembly 81, which attaches the motion activation assembly 80 of the motor assembly 70 to the handle 20 or neck 31 of the fork head 30. The motion activation assembly 80 includes a flexible or rigid connecting member 83, for attaching the handle 20 to the motion activation assembly 80. The connecting member 83 is preferably a strap. However, it can be appreciated that the connecting member 83 can be a clamp, a flexible band, a connecting rod or other suitable connector.

In operation, the fork 10 as shown in FIG. 5 having a top mounted motor assembly 70, which is fixedly attached to the upper tine segment 86 of the inner tine section 53 and a flexible or movable connection to the frame 32 or handle 20 can provide an inertia related drive for high displacement (HD) using a pendulum weight effect with the motor assembly 70. In addition, the fork 10 provides a motor driven or mechanically driven system for sustaining a sinusoidal motion from the motor assembly 70 through the connecting member 83, which provides for low displacement (LD) while operating at low to high frequencies (LF to HF). Typically, the top mounted motor assembly 70 is best suited for very large shavings with a structure (i.e., a mixture of manure and shavings) that is difficult to separate. However, it can be appreciated that a top mounted motor assembly 70 can be used with smaller compressed and bagged shavings, sawdust, or pellets.

FIG. 6 shows a perspective view of a manure fork with a bottom mounted motor assembly 70. As shown in FIG. 6, the bottom mounted motor assembly 70 is attached to the neck 31 of the frame 32 and/or the second end 24 of the handle 20 of the fork 10. The motor assembly 70 preferably includes a connection assembly 81, which is attached to the upper tine segment 86 of the inner tine section 53. The connection assembly 81 also includes either a rigid or flexible connecting member 83. The connecting member 83 is preferably a strap. However, it can be appreciated that the connecting member 83 can be a clamp, a flexible band, a connecting rod or other suitable connector. In operation or use, the bottom mounted motor assembly 70 combines a mechanically driven or motor assisted fork 10 with low displacement and low to high frequencies. The bottom mounted motor assembly 70 is typically best suited for pellets, sawdust, or smaller compressed and bagged shavings.

Figure 7:
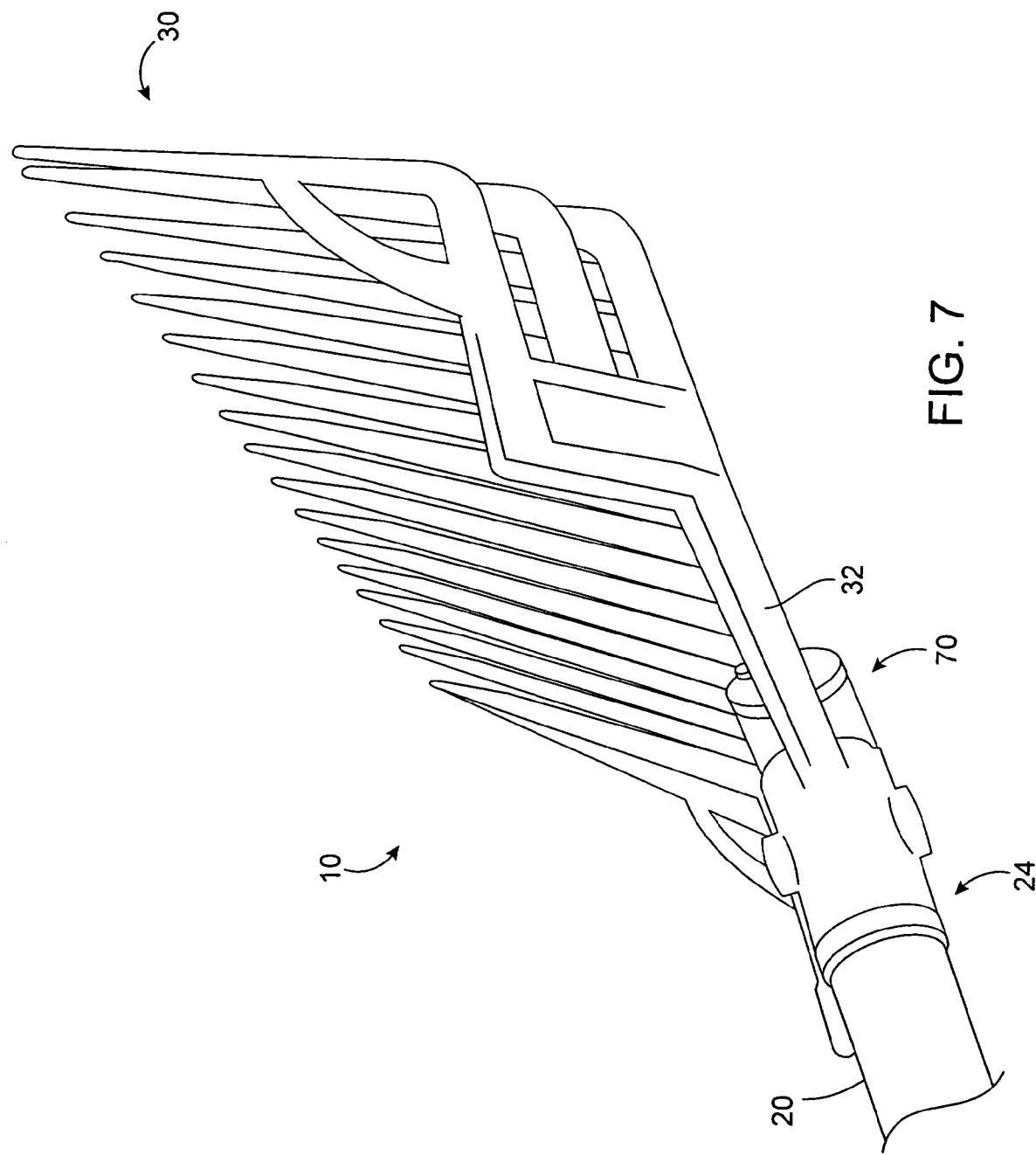
FIG. 7 shows a perspective view of a manure fork in accordance with another embodiment.

FIG. 7 shows a perspective view of a manure fork 10. As shown in FIG. 7, the motor assembly 70 is preferably a top or bottom mounted and imparts a sinusoidal or vibrating motion to the fork head 30. In this embodiment, the motor assembly 70 does not include a connection assembly 81, which is attached or secured to the upper tine segment 86 of the inner tine section 53. Instead, the motor assembly 70 and the motor activation assembly 80 includes a cam or other suitable device, which imparts a motion to the fork head 30, which causes the plurality of tines 36 to vibrate. The fork 10 as shown in FIG. 7, provides a mechanically driven or motorized manure fork with medium displacement (MD) and a low to medium frequency (LF/MF). In operation or use, the fork 10 is typically best suited for smaller and medium sized compressed and bagged shavings, sawdust and pellets.

It can be appreciated that the forks 10 as shown in FIGS. 5–7 can be modified to provide from low to high displacement and low to high frequency depending on the position of the motor assembly 70 and the motion activation assembly 80 including a variety of connection assemblies 81 and/or connecting members 83, including clamps, straps, flexible bands, a connecting rod, bearings 84, or other suitable connectors. It can be appreciated that in another embodiment, the gap 38 between the frame 32 and the motion activation assembly 80 can be filled and/or eliminated and a motor assembly 70 can be attached to the handle 20, neck 31 and/or frame 32 of the fork head 30 with a suitable rotating cam and/or member, wherein the motor assembly 70 imparts a vibrating or shaking sensation to the tines 36 support members 34 and the frame 32 of the fork head 30.

FIG. 8 shows a perspective view of a motion assisted manure fork in accordance with another embodiment. As shown in FIG. 8, the fork 10 includes the motion assisted manure fork 10 comprises a handle 20 and a fork head 30 with a motion assisted weight system 130. As shown, the fork head 30 comprises a neck 31, which receives the second end 24 of the handle 20, a frame 32, and a plurality of tines 36. The upper or first segment 42 of the outer tine section 51 is connected to the frame 32 of fork head 30 at a first or upper end 41 and to the angle of inclination 49 at a second or lower end 43. The lower segment 44 of the outer tine section 51 is connected to the angle of inclination 49 and at a second or lower end 47, the tines 36 have a tip 46. The tip 46 of the tines 36 can be a round tip, a pointed tip, a flat tip, a flattened surface or other end. The fork 30 is preferably made from a plastic material, such as polycarbonate. The fork 10 also includes a motion-assisted weight system 130, which comprises a support member 102 attached to the upper tine segment 86 of the inner tine section 53.

The support member 102 preferably includes an angular support 104. The angular support 104 includes a proximal or first end 106 attached to the support member 102 and a distal or second end 108 with a movable weighted member 132 attached to the distal end 108 of the angular support 104. The movable weighted member 132 comprises a weight 134 having an opening 136, which is configured to be movable along the distal end 108 of the angular support 104. The movable weighted member 132 also includes a screw or other device 138 to secure the weighted member 132 to the angular member 104. The angular support 104 can also include an optional elastic member 120, in the form of a spring 122 or other suitable material to dampen the pendulum motion of the weighted assembly. In addition, the handle 20 can also include a stop 124, preferably of elastic or shock absorbing material, which controls the motion and/or movement of the movable weighted member 132 during use. In use, the fork 10 as shown in FIG. 8, is a human driven fork, wherein the force is provided by the user to impart motion to the movable weighted member 132. The movable weighted member 132 imparts a pendulum like motion to the tines 36, wherein the tines 36 will move upward and downward, rotating around the hinge 37, from the torque imparted to the upper tine member 86 from the movable weighted member 132. The force imparted to the upper tine member 86 by the weighted member 132 produces a twisting motion to the flexible hinge 37. The hinge 37 acts like a spring and rebounds at the end of its travel providing inertia for the continued movement of the plurality of tines 36 in an upward and downward motion.

FIG. 9 shows a side view of the motion assisted manure fork 10 as shown in FIG. 8. As shown in FIG. 9, the upper or first segment 42 is substantially parallel to the handle 20 and the lower or second segment 44 forms a connecting angle 49 with the upper or first segment 42. This angle of inclination 49 can be between about 30 degrees and 60 degrees and more preferably the angle of inclination 49 is between about 45 degrees and 60 degrees. In addition, the frame 32, the upper or first segment 42 of the outer tine section 51 and the lower segment 44 of the outer tine section 51 can be curved or angled upward to form a scoop or basket-like fork head 30 to assist with the gathering and sifting of the manure from the shavings, sawdust or other siftable material.

As shown in FIG. 9, the fork head 30, wherein the upper or first segment 42 is typically substantially parallel to the handle 20 and the lower or second segment 44 forms an angle of inclination 49 with the upper or first segment 42. It can be appreciated that the upper or first segment 42 does not have to be substantially parallel to the handle 20 and that the handle's 20 angle of inclination 79 can be at a first angle 61 to the handle 20. In addition, the lower segment 44 of tines 36 is at a second angle 63 to the handle 20. The difference between the first and second angles 61, 63, (i.e., the angles of inclination 79, 49) can be between about 30 degrees and 60 degrees and more preferably is between about 45 degrees and 60 degrees.

It can be appreciated that the use of sinusoidal motion in the descriptions is not limiting and that the use of sinusoidal motion can also include oscillation, vibration, and/or pendulum movement, since by varying the displacement, velocity, acceleration or frequency there is an infinite variety of possible periodic cycles to move the tines 36, and that the different types of motor/inertia/pendulum/human combinations can produce individual cycles for specific types of structures. In addition, it can be appreciated that the embodiments as disclosed herein, is not limited to manure forks and can also be implemented on any suitable device for shifting and/or separating items from one another. For example the embodiments could be used to separate fine humus from debris in a garden, could be used in beach combing to separate sand from valuables and could even be used in archeology to separate fragments from soil. It can also be appreciated that the tine locations could be spaced in varying placements for specific purposes even to the point that the desirable material stayed on the top of the fork, while the undesirable material sifted through.

Figure 10:
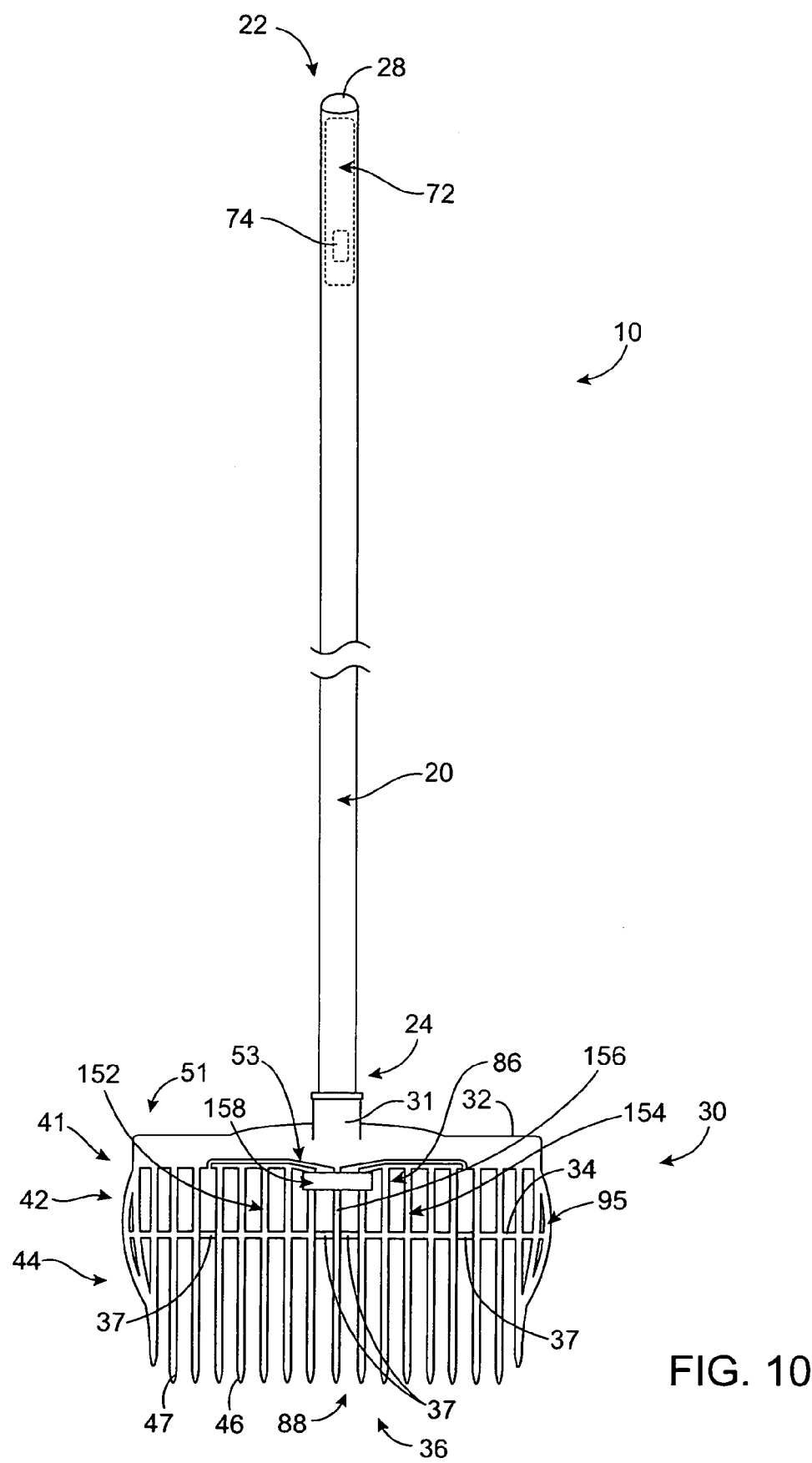
FIG. 10 shows a perspective view of a motion assisted manure fork in accordance with another embodiment.
Figure 12:
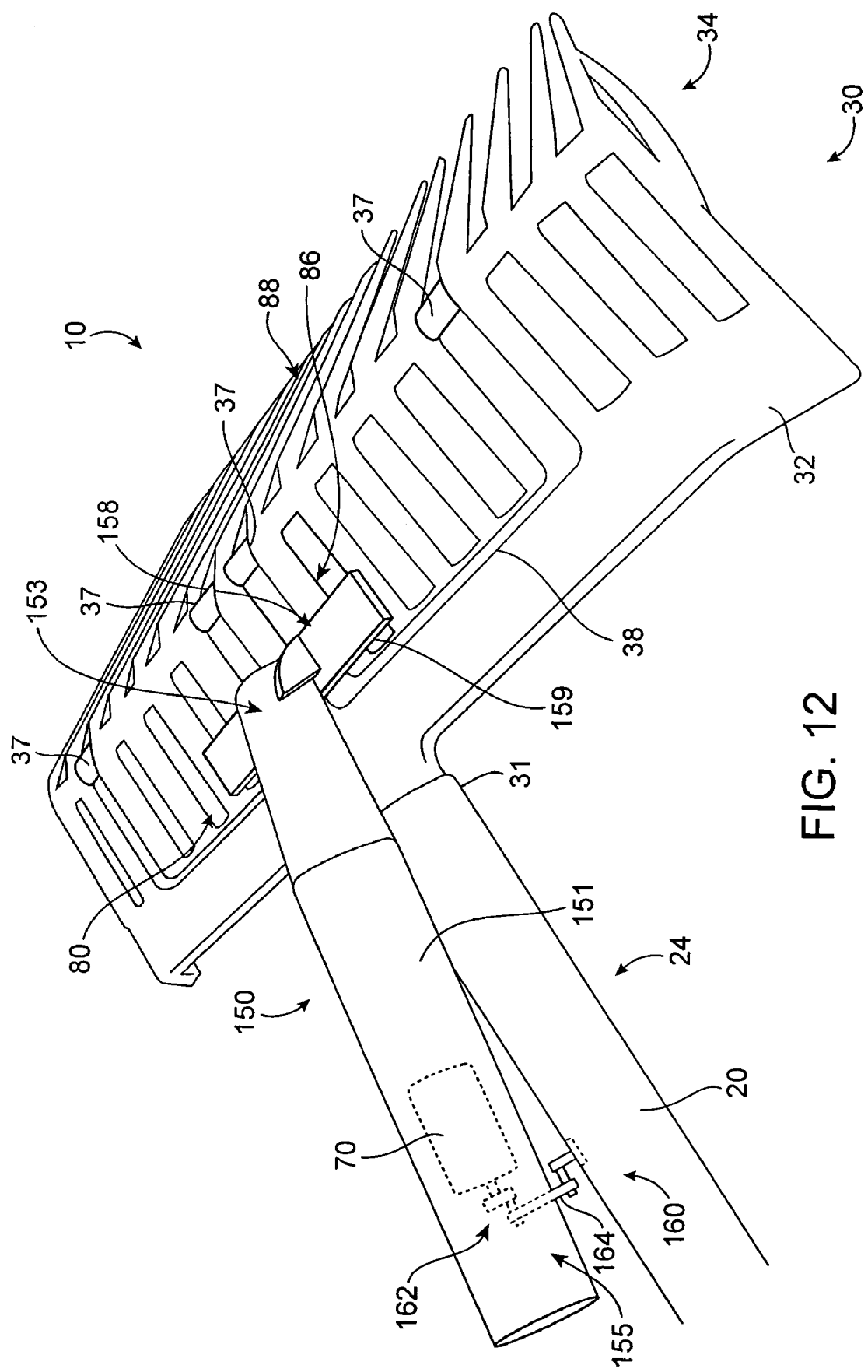
FIG. 12 shows a perspective view of the manure fork with a bottom mounted leverage assembly as shown in FIG. 10.

FIG. 10 shows a perspective view of a motion assisted manure fork 10 in accordance with another embodiment having a bottom mounted leverage assembly 150 (FIG. 12). As shown in FIG. 10, the motion assisted manure fork 10 includes a handle 20 and a fork head 30. The handle 20 includes a first end 22 and a second end 24, which is attachable to the fork head 30. The first end 22 of the handle 20 preferably includes an internal power source 72 and a variable speed control system 74. The control system 74 can be a rotary switch, a slide switch, a trigger switch or other suitable switch, which controls the on/off function of a bottom mounted leverage assembly 150, as well as the variable velocity and frequency at which the leverage assembly 150 can impart a sinusoidal motion to a plurality of tines 36 in such a manner that the tines 36 can be displaced from their equilibrium or resting position to a periodic or cyclic motion. It can be appreciated that the control system 74 can be top mounted with a thumb controlled switch or bottom mounted with a finger controlled switch. Furthermore, it can be appreciated that by varying the displacement, velocity, acceleration and/or frequency of the tines 36, the sinusoidal motion imparted to the tines 36 can include oscillation, vibration, or a pendulum motion.

The fork head 30 comprises a neck 31, which receives the second end 24 of the handle 20, a frame 32, and a plurality of tines 36. The plurality of tines 36 extend from the frame 32 at a first or upper end 41 to a second or lower end 47, wherein each of the plurality of tines 36 has a tip 46. The plurality of tines 36 is divided into a movable inner tine section 53, which is comprised of a first inner movable tine section 152 and a second inner tine section 154 with a fixed inner tine section 156 between the first and second inner movable tine sections 152, 154. The fixed inner tine section 156 includes at least one tine 36, which is fixedly attached to the frame of the fork head 30. The fork head 30 also includes a fixed outer tine section 51 on each side of the movable inner tine section 53. The plurality of tines 36 typically includes at least one support member 34, extending across the width of the plurality of tines 36. A plurality of hinges 37 separates the first and second inner tine sections 152, 154 from the fixed inner tine section 156 and the fixed outer tine sections 51. The leverage assembly 150 also includes a fixed connection assembly 158, which is attached to the inner tine section 53.

As shown in FIG. 10, the handle 20 is preferably an elongated hollow tubular or elliptical member. The handle 20 is preferably rigid and can be molded from a lightweight fiberglass material, aluminum, or a synthetic plastic or rubber material. It can be appreciated that any suitable material can be used as long as the material provides the handle 20 with sufficient rigidity to lift upwards of 50 lbs. It can be appreciated that the use of a fixed inner tine section 156 provides added rigidity to the fork head 30.

The power source 72 is preferably a rechargeable power source in the form of a rechargeable battery or batteries, or secondary cells, which can be re-charged after they have been drained. This is preferably performed by applying externally supplied electrical current, in the form of a charger or recharger (not shown), which causes the chemical changes that occur in use to be reversed. It can be appreciated that the rechargeable battery can be any suitable rechargeable device, including but not limited to any suitable "dry cell" type battery, including nickel-cadmium (NiCd), nickel metal hydride (NiMH), and lithium-ion (Li-Ion) cells. Alternatively, a disposable battery source can be used, such as standard alkaline or lithium battery. It can be appreciated that in any embodiment of the invention, for convenience of battery recharging, a commercially available charger can be made and arranged to conveniently contact and charge the power source 72 in place from the AC power line between usage events in the well manner of well-known recharging cordless tools such as hand drills and power screw drivers. The handle 20 and/or power source 72 will preferably have a connection 73 (FIG. 3) dimensioned to receive an AC power line to recharge the power source 72 as needed. It can also be appreciated that the battery may be removed altogether to be serviced or recharged at a remote charging station.

If a standard alkaline type or other replaceable battery is used, in accordance with another embodiment, the first end 22 can include a removable cap 28, which can be removed to access the power source 72. The removable cap can include a set of thread, which match a corresponding thread pattern on the exterior surface of the first end 22 of the handle 20. It can be appreciated that in an alternative embodiment, the power source 20 can include any suitable power source including but not limited to gasoline or gas powered motor.

Figure 11:
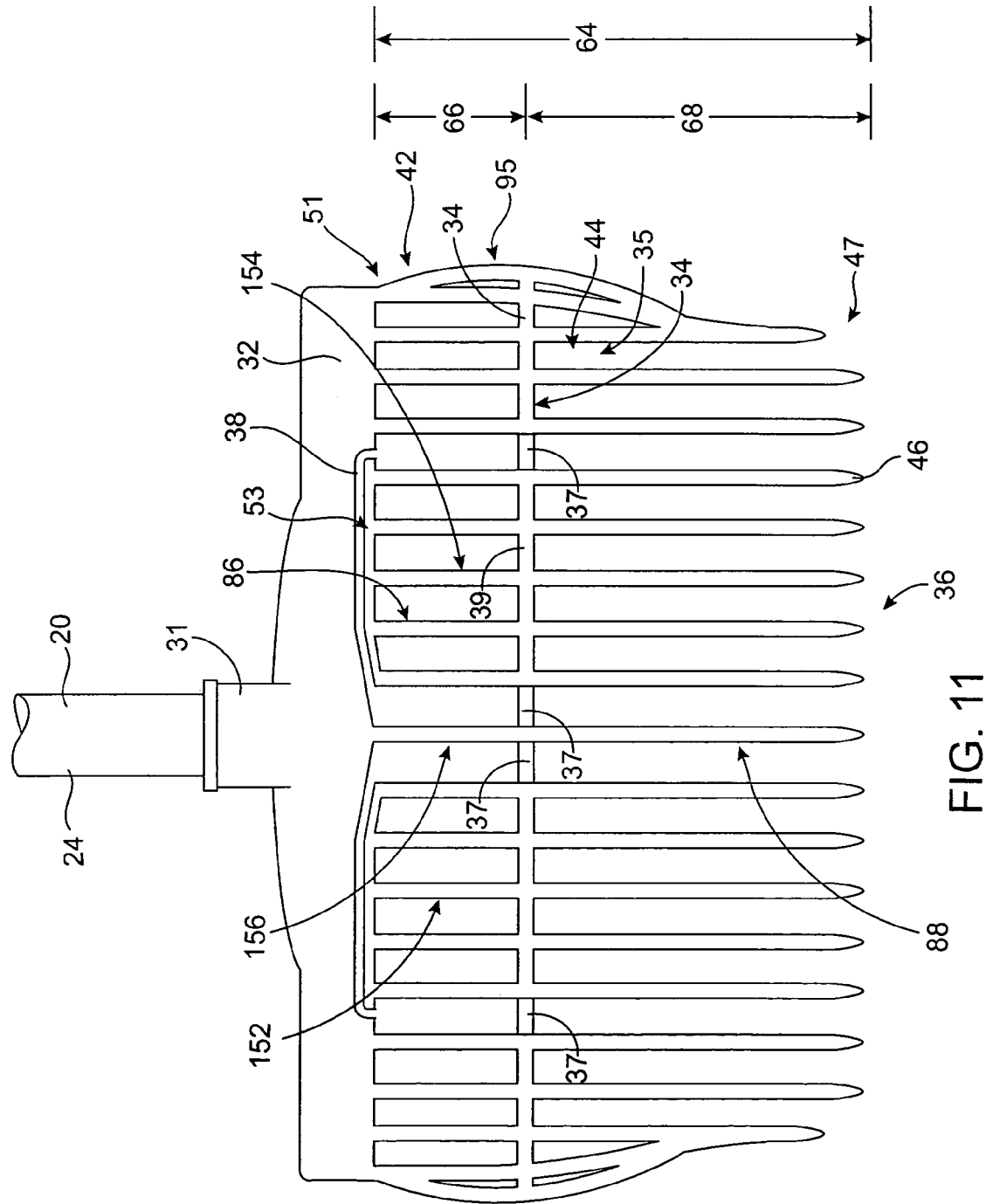
FIG. 11 shows a perspective view of the fork head of the motion assisted manure fork as shown in FIG. 10.

FIG. 11 shows a perspective view of the fork head 30 of the motion assisted manure fork 10 as shown in FIG. 10. As shown in FIG. 1, the fork head 30 includes a series or plurality of tines 36 which includes a movable inner tine section 53 and a fixed outer tine section 51. The movable inner tine section 53 is comprised of the first inner movable tine section 152 and the second inner tine section 154 with the fixed inner tine section 156 between the first and second inner movable tine sections 152, 154. The fork head 30 also includes a fixed outer tine section 51 on each side of the movable inner tine section 53. The outer section 51 of tines 36 on each end of the frame 32 is attached to and extends from the frame 32. The inner tine section 53 of tines 36 is not fixedly attached to the frame 32, but is attached to the outer tine section 51 by the hinge 37. It can be appreciated that between the inner tine section 53 and the outer section of tines 51 as well as the frame 32 of the fork head 30, a space or slot 38 there between can be present. Alternatively, the space or slot 38 between the frame 32 and the upper segment 86 of the inner tine section 53 of tines 36 can be filled with an elastic material or any other suitable material, wherein upon an imparting of a force to the upper tine segment 86 of the inner tine section 53, a sinusoidal motion can be imparted to the tines 36 in such a manner that the tines 36 are displaced from their equilibrium and/or a resting position. The hinge 37 can be made of any suitable material, including an elastomeric material, plastic, a steel wire encased in plastic. Alternatively, the hinge 37 can be a bearing, a bushing combination, or other suitable rod combination.

As shown in FIG. 11, the plurality of tines 36 typically include at least one support member 34, extending across the width of the plurality of tines 36. The support member 34 comprises a plurality of supports 35 positioned between the tines 36 to provide strength to the fork head 30 during use. The support member 34 typically coincides with a hinge 37 of the fork head 30. It can be appreciated that the support member 34 does not necessarily coincide with the hinge 37. The plurality of tines 36 preferably have an over length 64 of 10 to 18 inches and more preferably 11 to 15 inches.

FIG. 12 shows a perspective view of the manure fork 10 with a bottom mounted leverage assembly 150 as shown in FIG. 10. However, it can be appreciated that the leverage assembly 150 can be mounted on an upper or top surface of the handle 20 or on either side of the handle 20 without departing from the present invention. As shown in FIG. 12, the bottom mounted leverage assembly 150 is attachable on an underside or bottom of the handle 20 in the vicinity of the second end 24 of the handle 20 of the fork 10. The leverage assembly 150 is an elongated member 151 having a first end 153 and second end 155. The first end 153 of the elongated member 151 preferably includes a fixed connection assembly 158, which is attached to the upper tine segment 86 of the inner tine section 53. The second end 155 of the elongated member 151 preferably includes a connection assembly 160, which is attachable in the vicinity of the second end 24 of the handle 20. The connection assembly 160 includes a motion activation assembly 162 attached to the motor assembly 70 at one end and to a connecting rod 164 or other suitable device or member at the other end. In use, the motion activation assembly 162 and the connecting rod 164 impart a sinusoidal motion to the plurality of tines 36 via the leverage assembly 150.

As shown in FIG. 12, the fixed connection assembly 158 is attached to the movable inner tines 53 with a suitable connector 159. The connector 159 preferably extends across the fixed inner tine 156 to impart an oscillating motion into the movable inner tines 53. The motor assembly 70 can be housed or contained within the leverage assembly 150, housed or contained within the handle 20, or housed or located in any suitable position. In operation or use, the bottom mounted leverage assembly 150 combines a mechanically driven or motor assisted fork 10 with variable displacement and variable frequencies. The bottom mounted leverage assembly 150 is typically best suited for pellets, sawdust, or smaller compressed and bagged shavings. However, it can be appreciated that by varying the displacement and frequency with the variable control switch 74, the bottom mount leverage assembly 150 can be used with other types of bedding.

The motor assembly 70 preferably includes an electric motor having a variable speed system at the motion activation shaft ranging from about 2 Hz to 60 Hz and more preferably a variable speed range of 2 to 30 Hz. The output shaft preferably operates at approximately 400 to 1200 RPM and more preferably at approximately 900 RPM with an overdrive or top end speed of approximately 1200 RPM to separate bedding, which corresponds to approximately 15 to 20 strokes per second. In addition, it can be appreciated that with an operation speed of between approximately 400 to 1200 RPM, the tips of the tines 36 will have a movement of approximately 1.5 inches. It can be appreciated the variable speed function of the leverage assembly 150 and the control system 74 can include a defined speed function, such as a single, a dual, tri, quad speed system. For example, the variable speed function can include a 2-Hz setting and a 12-Hz setting. It can be appreciated that depending on the configuration of the motion activation assembly 160, the connection assembly 158 and the connecting member 159 that up to approximately 10 Hz, the leverage assembly 150 will impart a sinusoidal motion, which is of a general oscillating or pendulum motion (i.e., an up and down motion) to the tines 36. Meanwhile at greater than 10 Hz, the leverage assembly 150 imparts a sinusoidal motion, which will impart a vibrating motion, typically with a oscillation movement thereto, wherein the tines 36 appear to move in an up and down and a side to side motion.

Figure 13:
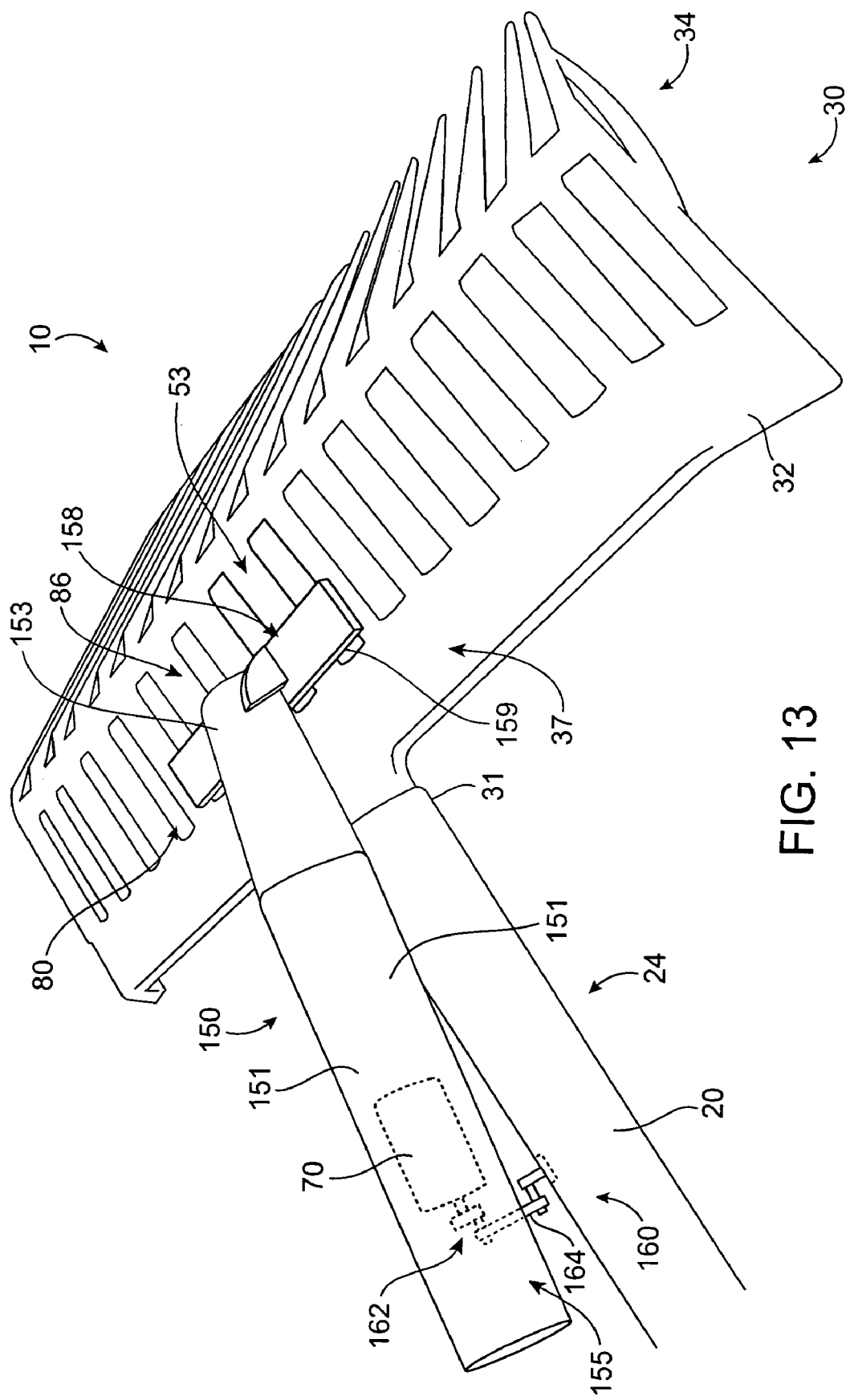
FIG. 13 shows a perspective view of a manure fork with a leverage assembly in accordance with another embodiment.

FIG. 13 shows a perspective view of a manure fork 10 with a leverage assembly 150 in accordance with another embodiment. As shown in FIG. 13, the motion assisted manure fork 10 includes a handle 20 and a fork head 30. The first end 22 (not shown) of the handle 20 preferably includes an internal power source 72 (not shown) and a variable speed control system 74 (not shown). The control system 74 can be a rotary switch, a slide switch, a trigger switch or other suitable switch, which controls the on/off function of the leverage assembly 150, as well as the variable velocity and frequency at which the leverage assembly 150 can impart a sinusoidal motion to a plurality of tines 36 in such a manner that the tines 36 can be displaced from their equilibrium or resting position to a periodic or cyclic motion.

The fork head 30 comprises a neck 31, which receives the second end 24 of the handle 20, a frame 32, and a plurality of tines 36. The plurality of tines 36 extend from the frame 32 at a first or upper end 41 to a second or lower end 47, wherein each of the plurality of tines 36 has a tip 46. In contrast to the embodiments as shown in FIGS. 1, 2, 4, 6, 8, and 10–12, the plurality of tines 36 are fixed or attached to the frame 32 of the fork head 30 and do not include a gap or space 38 as shown in those FIGS. 1, 2, 4, 6, 8, and 10–12. In addition, the leverage assembly 150 also includes a fixed connection assembly 158, which is attached to the upper tine segment 86 of an inner tine section 53. In this embodiment, the frame 32 of the fork head 30 is engineered and configured to act as a hinge 37, as the leverage assembly 150 imparts a sinusoidal motion to the plurality of tines 36.

As shown in FIG. 13, the bottom mounted leverage assembly 150 is attachable in the vicinity of the second end 24 of the handle 20 of the fork 10. The leverage assembly 150 preferably includes a fixed connection assembly 158, which is preferably attached to the upper tine segment 86 of the inner tine section 53, and a connection assembly 160, which is attachable in the vicinity of the second end 24 of the handle 20. It can be appreciated that the fixed connection assembly 158 can be attached to the plurality of tines 36, a portion of the frame 32 of the fork head 30 or other suitable portion of the fork head 30, wherein the leverage assembly 150 can impart a sinusoidal or other suitable motion to the plurality of tines 36. The connection assembly 160 preferably includes a motion activation assembly 162 and a connecting rod 164. The motion activation assembly 162 is connected at one end to a motor assembly 70, and at the other end to a connecting rod 164 or other suitable connection device or member. In use, the motion activation assembly 162 and the connecting rod 164 imparts a sinusoidal motion to the plurality of tines 36 via the leverage assembly 150.

As shown in FIG. 13, the fixed connection assembly 158 is preferably attached to the plurality of tines 36 with a suitable connector 159. The connector 159 preferably extends across a portion of the plurality of tines 36 flexing the frame 32 to impart an oscillating motion into the tines 36. The motor assembly 70 can be housed or contained within the leverage assembly 150, housed or contained within the handle 20, or housed or located in any suitable position. In operation or use, the bottom mounted leverage assembly 150 combines a mechanically driven or motor assisted fork 10 with variable displacement and variable frequencies. The bottom mounted leverage assembly 150 is typically best suited for pellets, sawdust, or smaller compressed and bagged shavings. However, it can be appreciated that by varying the displacement and frequencies with the variable control switch 74, the bottom mount leverage assembly 150 can be used with other types of bedding.

In addition, it can be appreciated that the inner tine section 53 and the frame 32 in combination with one another can be engineered and configured to act as a hinge 37 or plurality of hinges 37, and in combination with the leverage assembly 150 imparts a sinusoidal motion to the plurality of tines 36.

While the invention has been described in detail with reference to the preferred embodiments thereof, it will be apparent to one skilled in the art that various changes and modifications can be made and equivalents employed, without departing from the present invention.

The invention claimed is:

1. A motion assisted manure fork comprising:
a handle; and
a fork head comprising:
    a frame having a neck dimensioned to receive one end of the handle;
    a plurality of tines, the plurality of tines comprising:
        a movable inner tine section, the movable inner tine section having a first movable inner tine section, a second movable inner tine section and at least one fixed inner tine between the first movable inner tine section and the second inner tine section;
        a fixed outer tine section on each side of the inner section; and
        a plurality of hinges, the plurality of hinges connecting the first and second movable inner tine sections to the fixed outer tine sections and the fixed inner tine section; and
    a support member extending across the plurality of tines, the support member comprising a plurality of supports positioned between the tines.

2. The fork of claim 1, wherein the hinge divides the movable inner tine section into an upper tine segment and a lower tine segment.

3. The fork of claim 2, further comprising a slot between the frame and the first and second movable inner tine sections.

4. The fork of claim 1, further comprising a leverage assembly, wherein the leverage assembly imparts a sinusoidal motion to the movable inner tine section.

5. The fork of claim 4, wherein the leverage assembly further includes a motor assembly.

6. The fork of claim 5, further comprising a variable control switch, wherein the variable control switch varies the speed of the motor assembly that causes the plurality of tines to have a sinusoidal motion.

7. The fork of claim 1, further comprising an internal power source contained within an upper end of the handle.

8. A motion assisted manure fork comprising:
a handle;
a fork head comprising:
    a frame having a neck dimensioned to receive one end of the handle; and
    a plurality of tines, and wherein the plurality of tines further comprises a movable inner tine section, the movable inner tine section having a first movable inner tine section, a second movable inner tine section and at least one fixed inner tine between the first movable inner tine section and the second inner tine section; and
a motor assembly, wherein the motor assembly imparts a sinusoidal motion to the plurality of tines.

9. The fork of claim 8, further comprising a support member extending across the plurality of tines, wherein the support member comprises a plurality of supports positioned between the tines to provide strength to the fork head during use.

10. The fork of claim 8, wherein the motor assembly further comprises a variable control switch, wherein the variable control switch comprises a variable speed function, wherein the variable speed function varies the speed of the motor assembly that causes the plurality of tines to move in a sinusoidal motion.

11. A manure fork comprising:
a handle; and
a fork head comprising:
a frame having a neck dimensioned to receive one end of a handle;
    a plurality of tines, the plurality of tines comprising:
        a movable inner tine section, the movable inner tine section having a first movable inner tine section, a second movable inner tine section and at least one fixed inner tine between the first movable inner tine section and the second inner tine section; and
        a fixed outer tine section on each side of the inner section;
        a pair of hinges positioned between the first and second movable inner tine sections and the outer tine sections;
        a pair of hinges positioned between the first and second movable inner tine sections and the at least one fixed inner tine; and
    a support member extending across the plurality of tines, the support member comprising a plurality of supports positioned between the tines, wherein the outer tine sections are attached to and extend from the frame, and the inner tine section is not fixedly attached to the frame except by the hinge;
a motor assembly; and
a leverage assembly, wherein the leverage assembly is attached to at least a portion of the movable inner tine section at one end and moveably attached to the handle at a second, wherein the motor assembly imparts a sinusoidal motion to the plurality of tines via the leverage assembly.

12. The fork of claim 11, further comprising a motion activation assembly attached to the motor assembly and a connecting rod.

13. The fork of claim 12, wherein the connecting rod is dimensioned to be moveably attached to the handle.

14. The fork of claim 13, further comprising a variable control switch, wherein the variable control switch comprises a variable speed function, which varies the speed of the motor assembly.

15. A manure fork comprising:
a handle; and
a fork head, the fork head comprising:
- a frame having a neck dimensioned to receive one end of a handle;
- a plurality of tines, the plurality of tines comprising:
  - a movable inner tine section, the movable inner tine section having a first movable inner tine section, a second movable inner tine section and at least one fixed inner tine between the first movable inner tine section and the second inner tine section; and
  - a fixed outer tine section on each side of the inner section;
  - a pair of hinges positioned between the first and second movable inner tine sections and the outer tine sections; and
  - a pair of hinges positioned between the first and second movable inner tine sections and the at least one fixed inner tine; and a support member extending across the plurality of tines, the support member comprising a plurality of supports positioned between the tines, wherein the outer tine sections are attached to and extend from the frame, and the inner tine section is not fixedly attached to the frame except by the hinge;
a leverage assembly; and
a motor assembly within the handle, wherein the motor assembly imparts a sinusoidal motion to the plurality of tines through the leverage assembly via a motion activation assembly and a connecting rod.

* * * * *